Sept. 21, 1948.   J. C. NOBLE ET AL   2,449,565
RADIO SYSTEM
Filed March 31, 1944

INVENTORS
JOHN C. NOBLE
BEN F. HARDT
BY William D. Hall
ATTORNEY.

Patented Sept. 21, 1948

2,449,565

UNITED STATES PATENT OFFICE 2,449,565

RADIO SYSTEM

John C. Noble, Bath Township, Greene County, and Ben F. Hardt, Dayton, Ohio

Application March 31, 1944, Serial No. 528,918

2 Claims. (Cl. 179—171.5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to radio apparatus, and more particularly to improvements in radio frequency generators and modulators.

It is an object of this invention to provide a compact light weight device enabling large frequency deviation and easily adjustable frequency deviation.

A further object is the provision of a light weight modulator for producing random pulses and requiring no additional power supply.

These and other objects are attained by the novel construction and arrangements hereinafter described and illustrated by the accompanying drawings, forming a part hereof, and in which.

Figure 1:
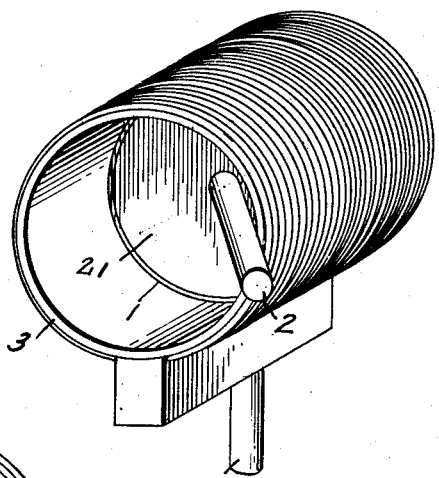
Fig. 1 is a perspective view of a frequency modulating device embodying the invention.
Figure 2:
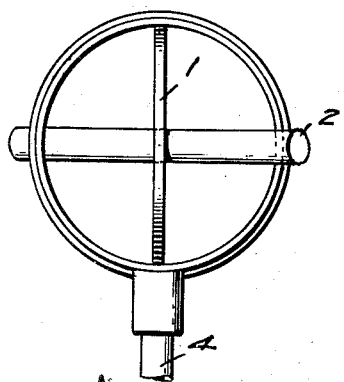
Fig. 2 is an end view of the device.
Figure 4:
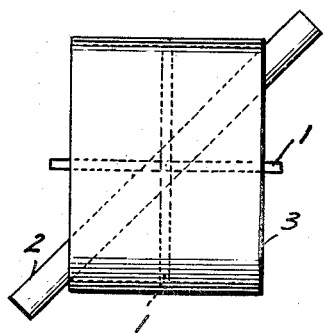
Fig. 4 is a top view of the device.
Figure 3:
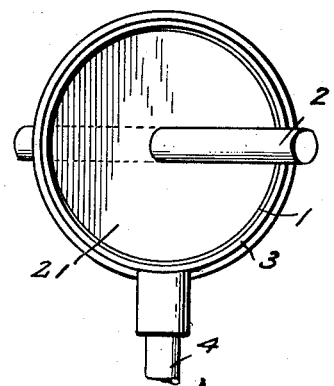
Fig. 3 is an end view of the device showing position of a disc in the coil when the shaft has been rotated 180° from the position in Fig. 2.

Referring to Figures 1 to 4 of the drawings, the frequency modulator is shown to comprise a metal ring 1 positioned in the tank coil 3 of an oscillator. The ring 1 is fixed to a fiber disc 21 mounted on a shaft 2 to rotate therewith, and the disc 21 is positioned so that it lies in a plane at 45° to the longitudinal axis of the shaft 2. The coil 3 is mounted on a shaft 4, and the shaft 2 passes longitudinally through the coil, the longitudinal axis of shaft 2 being at 45° to the longitudinal axis of the coil.

The ring 1 is machined from one block of steel, and silver plated. The ring is sprung into place in a groove on fiber disc 21 which is fixed to shaft 2. Since the ring is rotated with close coupling within the coil, the supporting frame of the coil is outside of the coil.

The longitudinal axis of the coil can coincide with or intersect the axis of rotation of the ring at any angle up to 45°. Due to this arrangement the shaft 2 does not run between turns of the coil, and the band-width is readily variable from zero to maximum. During each revolution of the shaft 2 the plane of the ring changes with respect to the plane of the coil turns from zero to 90°. That is, the ring assumes two extreme positions, one in a plane at right angles to the longitudinal axis of the coil, and another position in a plane parallel to the longitudinal axis of the coil.

When the ring is in a plane parallel with the axis of the coil (see Fig. 2) it has little effect upon the tank circuit, and the inductance of the coil is nearly the same as if the ring were omitted. When the ring is perpendicular to the longitudinal axis of the coil (see Fig. 3 and dotted line position in Fig. 4), it acts as a short circuited secondary and reacts on the field of the coil, reducing its effective inductance, and thus raises the frequency of the circuit. In this manner rotation of the ring causes the circuit to resonate through a band of frequencies. The band width increases with increased coupling between the ring and coil, which results from decreasing the gap between the ring and coil.

From the above description it will be seen that there has been provided a simple device for changing the frequency of a tank circuit. The device is capable of easy adjustment to large frequency deviation. It is also light in weight and requires a minimum of auxiliary equipment.

Figure 5:
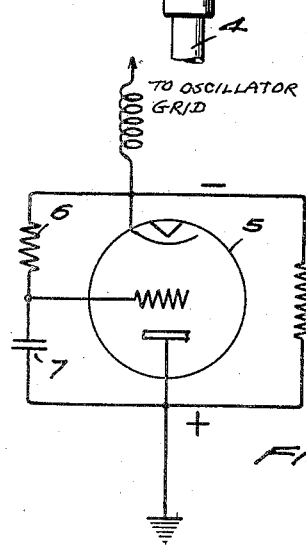
Fig. 5 is a wiring diagram of an amplitude modulating device.

Referring to Fig. 5, there is shown an amplitude modulator producing a random pulse signal by random triggering of the quench circuit of a self-quenched oscillator. The random noise source is integral with the modulator, which consists of a triode vacuum tube 5, between the oscillator grid and ground. The grid current of the oscillator passes to ground through the cathode-plate circuit of the triode modulator, thus providing plate current and plate voltage for this modulator tube 5. This current is varied in random fashion by the injection of thermal noise voltage into the control grid of tube 5, through the medium of a high resistance 6, between control grid and cathode. The variation in oscillator grid bias triggers the quench system randomly at instantaneous frequencies above and below the mean quench frequency. The capacity of the condenser 7 and resistance of resistor 8, for maximum signal depends on the frequencies and voltages used.

Figure 6:
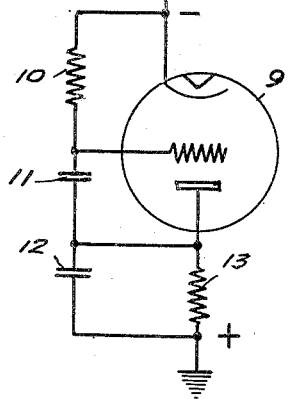
Fig. 6 is a wiring diagram of a modified form of amplitude modulating device.

In Fig. 6 is shown an alternative circuit in which the circuit constants depend upon operating conditions. In this figure a triode modulator tube 9 is interposed between the oscillator grid and ground. A resistor 10 and capacitors 11 and 12 are in parallel with the tube circuit as shown, while a resistor 13 is in series with the tube circuit.

The modulators shown in Figs. 5 and 6, produce effective type signals, that is, random pulses without necessitating additional power supply. The modulators are light in weight, and produce good modulation percentage, and the random pulse signal source is an integral part of the modulators.

What is claimed is:

1. In combination with a self-quenched oscillator, an amplitude modulator to produce random pulse signals by random triggering of the quench circuit of the oscillator, said modulator comprising a triode vacuum tube in the circuit between the grid of the oscillator and ground, and means to inject thermal noise voltages into the control grid of the tube.

2. In combination with a self-quenched oscillator, an amplitude modulator to produce random pulse signals by random triggering of the quench circuit of the oscillator, said modulator comprising a triode vacuum tube in the circuit with its cathode connected to the oscillator grid and its plate connected to ground, and means to vary the cathode-plate current of the tube in random fashion by the injection of thermal noise voltages into the control grid of the tube through the medium of a high resistance.

JOHN C. NOBLE.
BEN F. HARDT.

REFERENCES CITED

The following references are of record in the file of this patent:

UNITED STATES PATENTS

| Number | Name | Date |
|---|---|---|
| 1,578,396 | Clark | Mar. 30, 1926 |
| 1,648,402 | Idzerda | Nov. 8, 1927 |
| 1,666,685 | Clough | Apr. 17, 1928 |
| 2,257,663 | Albrect | Sept. 30, 1941 |